Dec. 15, 1959     E. H. SMITH     2,916,846
FISHING LURE
Filed Oct. 23, 1956
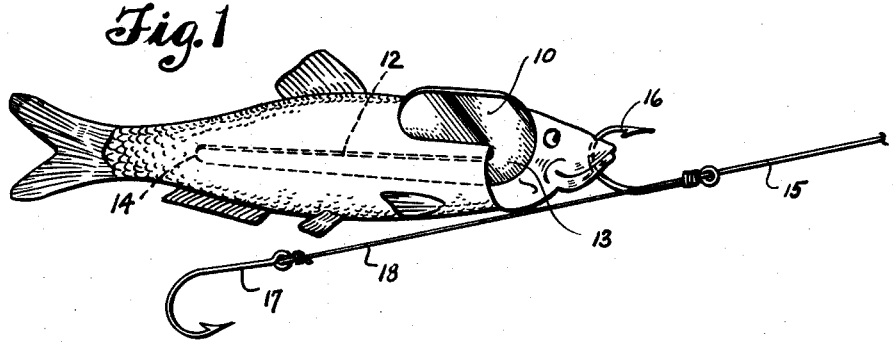
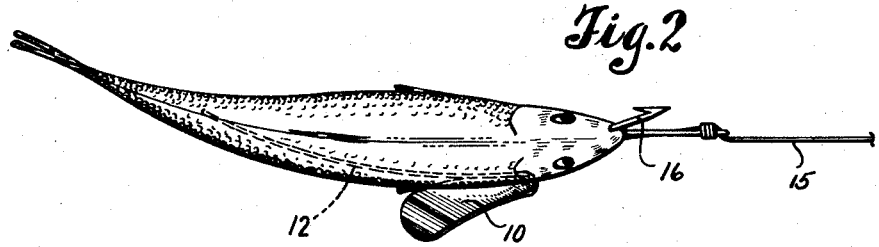
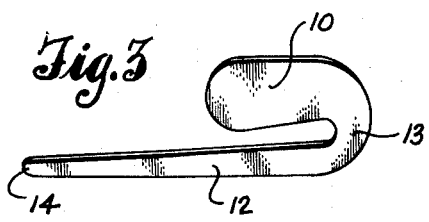
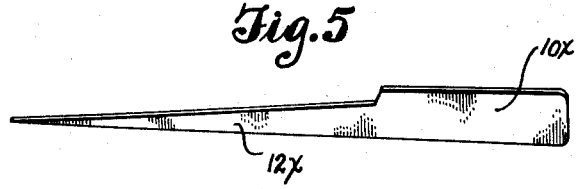
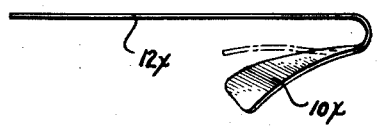
INVENTOR.
EUGENE H. SMITH
BY
Robinson & Berry
ATTORNEYS

United States Patent Office 2,916,846
Patented Dec. 15, 1959

2,916,846

FISHING LURE

Eugene H. Smith, Seattle, Wash.

Application October 23, 1956, Serial No. 617,770

1 Claim. (Cl. 43—44.4)

This invention relates to fish lures and the like, and it has reference more particularly to accessory or attachment devices adapted to be applied directly to bait fish as used in trolling, to give the bait an attracting action that simulates that of a live fish.

It is the principal object of this invention to provide a lure that has an affixing pin or spike adapted to be applied longitudinally within the body of a bait fish, such as for example, a herring as used in trolling for salmon, and which lure has no direct connection with the fishing line or leader and carries no hooks.

It is also an object of the present invention to provide a lure of the character above stated, wherein the affixing pin or spike, when applied to the bait fish, can be laterally bent or curved in such manner as to curve the bait in a similar way, and thus caused to move with a lateral darting and spiraling action as drawn through the water.

Still another object of the invention is to provide a lure of the character above stated comprising a fin forming portion that, when mounted by the pin to extend from the side of the bait fish can be easily bent to various shapes to cause it to impart various erratic movements or spinning actions to the bait as drawn through the water.

Still further objects and advantages of the invention reside in the specific form, character and use of the lure as will hereinafter be fully described.

In accomplishing the above mentioned and various other objects I have provided improved details of construction illustrated in the accompanying drawings, wherein:

Fig. 1 is a side view of a typical bait fish to which a lure, formed as an accessory or attachment and embodied by the present invention, has been applied.

Fig. 2 is a top view of the bait fish with the present lure applied thereto, and indicating one manner of bending its mounting prong or spike to give the bait fish a desired curvature that will cause an erratic darting action when drawn through the water.

Fig. 3 is a perspective view of the lure removed from the bait fish.

Fig. 4 is an edge view of the same.

Fig. 5 is a side view of a lure embodied by the present invention, of an alternative form.

Fig. 6 is an edge view of the same with the fin portion bent in a manner for imparting spinning action to the bait fish.

Referring more in detail to the drawings:

First, it is to be explained that the present accessory device or attachment, which for convenience in this specification will be referred to as a "lure," differs from other lures in that it has no direct connection with the fishing line or leader but is independent thereof and is applied directly to the bait fish; this lure being designed particularly for application to such bait fish as live or dead herring, as used in trolling for salmon. For convenience in this specification, the bait fish will be referred to as a "herring."

In its present preferred form, the lure of this invention is stamped, cut or otherwise formed from suitable sheet material such as aluminum, or other light weight metal. As shown in the flat in Fig. 3, it comprises a fin portion 10 and a mounting prong, spike or pin 12; these parts, 10 and 12, as formed from the sheet material, being disposed in the same plane. As noted best in Fig. 3, the fin portion 10 is substantially of oval form, and is disposed along and at one edge of the base end portion of the prong or pin, and it has a length which is about one-half that of the latter. The base end of the pin is joined with the base end of the fin by an integral, curved neck portion 13. The pin is narrow and elongated and is rounded or pointed at its end, as at 14, to facilitate its application to the bait fish.

To apply the lure to a bait fish, as has been shown in Fig. 1, the pin 12 is projected into the body of the fish, entering at one side of the head through a gill slot and directed rearwardly in the body, as has been indicated by its dotted line showing in Fig. 1, until the neck portion limits farther entrance. The fin 10 then may be bent to the outwardly curved form shown, or given a twisted form, according to the action desired of the herring as drawn through the water during a trolling operation. Also, it is to be understood that the pin 12 can be curved to any extent toward either side thus to give the herring a like curvature that will cause it to have a characteristic action in the water, such lateral curving has been illustrated in Fig. 2.

The manner of attaching the herring to the line or leader may be as shown in Fig. 1 or it may be effected by use of jigs or harness of various kinds. In the present showing, the leader 15 is attached to a hook 16 which is applied through the nose portion of the herring and a trailing hook 17 is attached by a short leader 18.

In Fig. 5, I have illustrated an alternative form of lure. This, as in the case of the device of Fig. 3, is cut or stamped from suitable sheet material, in the elongated spoke-like form shown. It has the narrow, elongated mounting portion 12x tapered to a point, and formed with a widened fin portion 10x at its base end. This device is applied to the bait fish in the same manner as the device of Fig. 1, and then the fin portion may be bent laterally and rearwardly and may be given any desired curvature, or twist, depending on the action desired. Also, the pin, before or after being applied to the bait, can be bent to give the bait fish any desired curvature.

The application and use of either of the present devices permits the fisherman, by proper bending of the mounting pin and fin portions thereof, either before or after it has been applied to the herring, to give the herring any desired action in the water, such as for example, slow or fast spinning, darting wabbling or looping, to suit the occasion. The lure is light in weight, easy to apply, and its fin portion adds the flash and allure of a spinner thereto. Its application to the bait adds no appreciable pull on the line and it in no way serves as a means that would aid a caught fish to escape. It can be made inexpensively in various sizes, and it can be modified in shape within reasonable limits without departing from the spirit of the invention.

What I claim as new is:

A fishing accessory in the form of a lure designed for mounting in a bait fish typified by herring, said bait fish being adapted to be secured at its head end to a fish line independently of said lure, said lure being formed in one piece from bendable sheet metal and comprising a flat, elongated, imperforate mounting pin and a single flat fin forming plate substantially of oval form, said fin being laterally offset from a head portion of the pin and joined thereto by a curved neck portion constituting an extension of the end of the pin, said pin being adapted to be projected into the body of the bait fish through a gill slit rearwardly of the securement of the bait fish to the fish line, said pin extending rearwardly within the bait fish to near its tail portion and thereby locate the fin portion at the side of the fish rearwardly of its gill, said fin portion being laterally bendable to various degrees of curvature to impart more or less spinning motion to the bait fish as it is drawn through the water and said pin being bendable laterally to hold the body of the bait fish in a similarly bent condition to impart spinal and lateral darting action thereto as drawn through the water.

References Cited in the file of this patent

FOREIGN PATENTS

| | | |
|---|---|---|
| 11,135 | Great Britain | June 30, 1891 |
| 24,785 | Great Britain | 1894 |
| 144,010 | Great Britain | June 10, 1920 |